United States Patent
Yokota

(10) Patent No.: US 9,096,232 B2
(45) Date of Patent: Aug. 4, 2015

(54) VEHICLE CONDITION ESTIMATING DEVICE

(75) Inventor: Takahiro Yokota, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 189 days.

(21) Appl. No.: 13/131,408

(22) PCT Filed: Jan. 13, 2009

(86) PCT No.: PCT/JP2009/050271
§ 371 (c)(1),
(2), (4) Date: May 26, 2011

(87) PCT Pub. No.: WO2010/082288
PCT Pub. Date: Jul. 22, 2010

(65) Prior Publication Data
US 2011/0257876 A1 Oct. 20, 2011

(51) Int. Cl.
*G06G 7/70* (2006.01)
*G01G 19/07* (2006.01)
*B60W 40/12* (2012.01)
*G01G 19/08* (2006.01)
*B62K 3/00* (2006.01)

(52) U.S. Cl.
CPC ............... *B60W 40/12* (2013.01); *B62K 3/007* (2013.01); *G01G 19/086* (2013.01)

(58) Field of Classification Search
CPC ..... B62K 3/007; G01G 19/086; G01M 1/122; G01M 1/12; B60T 8/172
USPC ......................................................... 701/124
See application file for complete search history.

(56) References Cited

U.S. PATENT DOCUMENTS

| | | | | |
|---|---|---|---|---|
| 2,443,098 A | * | 6/1948 | Dean | 701/124 |
| 3,443,077 A | * | 5/1969 | Lettvin | 702/169 |
| 4,086,576 A | * | 4/1978 | Jebb et al. | 340/440 |
| 4,848,508 A | * | 7/1989 | Smirl et al. | 180/248 |
| 5,469,928 A | * | 11/1995 | Adler et al. | 180/6.28 |
| 5,671,143 A | * | 9/1997 | Graber | 701/72 |
| 5,747,683 A | * | 5/1998 | Gerum et al. | 73/117.01 |
| 5,774,821 A | * | 6/1998 | Eckert | 701/78 |

(Continued)

FOREIGN PATENT DOCUMENTS

| | | |
|---|---|---|
| JP | 06-099758 A | 4/1994 |
| JP | 10-338496 A | 12/1998 |

(Continued)

OTHER PUBLICATIONS

International Search Report of PCT/JP2009/050271 Issued Apr. 28, 2009.

*Primary Examiner* — Behrang Badii
*Assistant Examiner* — Daniel L Greene
(74) *Attorney, Agent, or Firm* — Kenyon & Kenyon LLP

(57) ABSTRACT

There is provided a vehicle condition estimating device which enables the estimations of the longitudinal position of a vehicle centroid, loads exerted on front and rear wheel axles and cornering powers even during the running of a vehicle without detecting directly the loads exerted on front and rear wheel axles. The inventive device is characterized by estimating a centroid position in the longitudinal direction of a vehicle based on a vehicle weight value, a stability factor value, a relation between a front wheel axle load and a front wheel cornering power and a relation between a rear wheel axle load and a rear wheel cornering power.

11 Claims, 5 Drawing Sheets

(56) References Cited

U.S. PATENT DOCUMENTS

| | | | |
|---|---|---|---|
| 5,995,888 A * | 11/1999 | Hagenbuch | 701/32.3 |
| 6,584,396 B2 * | 6/2003 | Wetzel et al. | 701/70 |
| 6,968,920 B2 * | 11/2005 | Barton et al. | 180/446 |
| 7,340,368 B2 * | 3/2008 | Fiedler et al. | 702/145 |
| 2005/0189163 A1 * | 9/2005 | Barton et al. | 180/446 |
| 2006/0148617 A1 * | 7/2006 | Billig | 477/175 |
| 2006/0173597 A1 * | 8/2006 | Pelchen et al. | 701/41 |
| 2006/0273657 A1 * | 12/2006 | Wanke et al. | 303/146 |
| 2007/0164852 A1 * | 7/2007 | Litkouhi | 340/435 |
| 2008/0029328 A1 * | 2/2008 | Hoeck et al. | 180/248 |
| 2010/0071984 A1 * | 3/2010 | Doi et al. | 180/218 |

FOREIGN PATENT DOCUMENTS

| | | |
|---|---|---|
| JP | 11-094711 A | 4/1999 |
| JP | 2002-333365 A | 11/2002 |
| JP | 2004-026073 A | 1/2004 |
| JP | 2005-184971 A | 7/2005 |
| JP | 2005-199882 A | 7/2005 |
| JP | 2005-239011 A | 9/2005 |

* cited by examiner

● : Rear wheel double tire
○ : Front wheel single tire

● : Rear wheel double tire
○ : Front wheel single tire

US 9,096,232 B2

VEHICLE CONDITION ESTIMATING DEVICE

This is a 371 national phase application of PCT/JP2009/050271 filed 13 Jan. 2009, the contents of which are incorporated herein by reference.

TECHNICAL FIELD

This invention relates to a device which estimates various conditions or motion characteristics of a vehicle, such as an automobile, more specifically, to a device which can estimate the longitudinal position of the centroid of a vehicle during the running of the vehicle, or a device which can estimate, from an estimated longitudinal position of a vehicle's centroid, vehicle characteristics, such as wheel axle loads and cornering powers of front and rear wheels, etc.

BACKGROUND ART

In vehicles, such as automobile, in recent years, in order to stabilize a vehicle's running motion, a variety of behavior controls, motion controls or running controls have been more often executed. In these controls, a control of a braking-driving force of each wheel or a steering angle of a vehicle is executed using a model of a vehicle body motion or tires, so that the motion condition (yawing, rolling etc.) of the vehicle can be stabilized. For instance, in the controls of ABS (Anti-lock Braking System), TRC (Traction Control), etc., the magnitudes of the braking-driving forces applied to the respective wheels are controlled in order to adjust the slip ratios of the respective wheels so that the tire force of each wheel does not exceed beyond a friction circle. Further, in VSC (Vehicle Stability Control), in order to stabilize a vehicle motion in the yaw direction, a braking-driving force difference between right and left wheels or a steering angle of a vehicle is controlled, and thereby the yaw moment control around the centroid of the vehicle is attained.

As understood by one skilled in the art, in the execution of a vehicle's behavior, motion or running control as described above, characteristic values which vary depending on the amount and arrangement of loaded objects (loaded condition) on a vehicle, such as a vehicle weight, a stability factor, the distances from the vehicle's centroid to the front and rear wheel axles, wheel axle loads on the respective wheels, cornering powers of the respective wheels, etc., are often required as parameters for those controls. In a case of a typical private vehicle, since the variations in the number of riding persons or the amount of loaded objects in a vehicle are small, those parameters are approximately given as constant values. However, in a case of a vehicle of medium size to large size, e.g. a bus, a truck, etc., in which the variations in the amount and positions of loaded objects in a vehicle are large, it is preferable that the parameters which can vary depending on the amount of loaded objects on a vehicle are detectable during the use or running of the vehicle and available in the behavioral, motional or running controls in order to accomplish the more precise executions of the controls. Thus, in the prior art, it has been proposed to estimate, among the parameters which vary depending on the loaded condition of a vehicle, a vehicle weight from a relation between a driving force and acceleration or a relation between a braking force and deceleration during the running of a vehicle (Patent document 1). Moreover, it is known that a stability factor can be determined from detected values, such as a steering angle, a yaw rate and a vehicle speed of a running vehicle (Patent documents 2 and 3). Furthermore, in Patent document 4, there is proposed a device which directly detects each wheel axle load by means of a load sensor; estimates a vehicle weight and a longitudinal position of a vehicle centroid from the detected values; and uses the estimated values for a behavior control of a vehicle.

Patent document 1: Japanese patent Laid-Open publication 2002-333365

Patent document 2: Japanese patent Laid-Open publication 2004-26073

Patent document 3: Japanese patent Laid-Open publication H11-94711

Patent document 4: Japanese patent Laid-Open publication 2005-199882

DISCLOSURE OF INVENTION

Objects to be Solved by the Invention

As described in the patent document 4, the estimation of parameters, such as the longitudinal position of a vehicle centroid, a cornering power of each wheel, etc., which vary depending on a loaded condition on a vehicle can be done by attaching a load sensor to the respective front and rear wheel axles of the vehicle and detecting the wheel axle load exerted on each wheel axle directly. However, in that case, the designing and assembling for installing a load sensor to a rolling bearing unit of a wheel axle is required. Thus, if the estimation of such parameters that vary depending on the loaded condition of a vehicle becomes possible without requiring equipment which detects directly a wheel axle loads exerted on front and rear wheel axles, it will be advantageous because the labor and expense for the attaching of load sensors become unnecessary. In this regard, according to the research of the inventor of the present invention, it has been found that, in a running vehicle, if its vehicle weight and stability factor can be determined, the longitudinal position of its vehicle centroid, one of the parameters which vary depending on a loaded condition of the vehicle, can be estimated, and thereby, the wheel axle loads and/or the cornering powers of the front and rear wheels can be estimated.

Accordingly, one object of the present invention is to provide a vehicle condition estimating device which can estimate a longitudinal position of a vehicle centroid without detecting directly wheel axle loads exerted on front and rear wheel axles even during the running of a vehicle.

Moreover, another object of the present invention is to provide a vehicle condition estimating device as described above, which can estimate wheel axle loads or cornering powers in the front and rear wheels using the estimated longitudinal position of the vehicle centroid.

The Means for Solving the Objects

In the field of the vehicle motion control, it is known that a stability factor (KH), used in describing the motion characteristics of a vehicle, is a function of a vehicle weight M, a wheel base L, a distance Lf from a front wheel axle to a vehicle centroid, a distance Lr from a rear wheel axle to the vehicle centroid, a cornering power Kf of a front wheel tire, and a cornering power Kr of a rear wheel tire (The cornering powers of the front and rear wheels are values in the case of, so-called, the 2 wheel model.). Accordingly, the stability factor is expressed in the form of:

$$KH = \Psi(M, L, Lf, Lr, Kf, Kr) \qquad (1)$$

In the variables of the function $\Psi$ for KH, it is known that the cornering power Kf of the front wheel tire and the cornering power Kr of the rear wheel tire each are expressed as a function of a front wheel axle load Mf and a rear wheel axle load Mr:

$$Kf = \kappa f(Mf) \quad (2a);$$

$$Kr = \kappa r(Mr) \quad (2b)$$

Moreover, from the balance of moments of forces in the perpendicular direction, the front wheel axle load Mf and rear wheel axle load Mr are given by:

$$Mf = M \cdot Lr/L \quad (3a),$$

$$Mr = M \cdot Lf/L \quad (3b).$$

And, for L, Lf, and Lr, the relation:

$$L = Lf + Lr \quad (4)$$

is given. Then, using the relations of the formulas (2a), (2b), (3a), (3b) and (4), the variables Kf, Kr and Lr (or Lf) can be eliminated from the formula (1), and the function of the formula (1) can be rewritten in the form of:

$$KH = \Psi(M, L, Lf)$$

$$[\text{or } KH = \Psi(M, L, Lr)] \quad (5)$$

Therefore, if Lf (or Lr) is solved in the formula (5), Lf (or Lr) will be expressed as a function of the stability factor KH, the vehicle weight M and the wheel base L:

$$Lf = \lambda(KH, M, L)$$

$$[\text{or a } Lr = \lambda(KH, M, L)] \quad (6)$$

And by computing Lf (or Lr) from this formula (6), the position of the centroid in the longitudinal direction of a vehicle will be found. That is, the position of the centroid in the longitudinal direction of a vehicle can be estimated from a stability factor KH, a vehicle weight M, and concrete expressions of functions $\kappa f$, $\kappa r$ in the formulas (2a), (2b), i.e., the relation between the front wheel axle load and front wheel cornering power, and the relation between the rear wheel axle load and rear wheel cornering power.

Thus, from the above-mentioned knowledge, according to one aspect of the present invention, a vehicle condition estimating device is characterized by estimating a centroid position in a longitudinal direction of a vehicle based on a vehicle weight value, a stability factor value, a relation between a front wheel axle load and a front wheel cornering power and a relation between a rear wheel axle load and a rear wheel cornering power. In this structure, the relation between the front wheel axle load and front wheel cornering power and the relation between the rear wheel axle load and rear wheel cornering power can be previously obtained (see the columns of embodiments). Therefore, according to the above-mentioned inventive device, it becomes possible to estimate a position of the centeroid in the longitudinal direction of a vehicle during the running of the vehicle without detecting the wheel axle loads of front and rear wheels directly, i.e. without requiring a load sensor.

In the structure of the above-mentioned inventive device, a vehicle weight value and a stability factor value at a present time may be estimated or determined during the use or the running of a vehicle with a known technique, e.g. the techniques as in the patent documents 1 and/or 2. Since a relation between a front wheel axle load and a front wheel cornering power and a relation between a rear wheel axle load and a rear wheel cornering power, i.e., the forms of the functions $\kappa f$, $\kappa r$ in the formulas (2a), (2b), can be determined with the characteristics of a tire used for each wheel, these relations can be acquired experimentally or theoretically beforehand. Therefore, the relation between the front wheel axle load and front wheel cornering power and the relation between the rear wheel axle loads and rear wheel cornering power may be determined from a group of previously obtained values of the front wheel cornering power to the front wheel axle load, and a group of previously obtained values of the rear wheel cornering power to the rear wheel axle load, respectively.

Further, regarding the relation between the wheel axle load and cornering power, it is known that a value of a cornering power of a tire generally increases with an increase of a wheel axle load, and eventually becomes saturated. In this regard, it has been found that, typically, a cornering power value of a tire can be well approximated as a quadratic (second-order) function of a wheel axle load value. Namely, more concretely, the formulas (2a) and (2b) can be expressed as:

$$Kf = \kappa f(Mf) = af \cdot Mf^2 + bf \cdot Mf + cf \quad (2c);$$

$$Kr = \kappa r(Mr) = ar \cdot Mr^2 + br \cdot Mr + cr \quad (2d),$$

where af, bf, cf, ar, br and cr are constant coefficients, respectively. Accordingly, in the inventive device as described above, the relation between the front wheel axle load and front wheel cornering power may be a relation obtained by approximating the front wheel cornering power as a quadratic function of the front wheel axle load, and the relation between the rear wheel axle load and rear wheel cornering power may be a relation obtained by approximating the rear wheel cornering power as a quadratic function of the rear wheel axle load. In the case of this structure, the constant coefficients which define the relations between the wheel axle load and cornering power of the tires of the front wheel and rear wheels can be calculated beforehand, and therefore, in the inventive device, only the constant coefficients af, bf, cf, ar, br, and cr in the formulas (2c), (2d) are to be memorized for the respective relations between the wheel axle load and cornering power in the front wheel and rear wheels, so that the reduction of the memory capacity of the inventive device and an accurate estimation of the centroid position in the longitudinal direction of a vehicle will become possible. In this regard, such an approximate formula may be acquired by other techniques, such as polynomial approximation, logarithmic approximation, etc., other than a quadratic function.

On the other hand, the use of the form of the formulas (2c), (2d), i.e., the form of a quadratic function, for relations between a wheel axle load and a cornering power in front and rear wheels, makes the order of Lf or Lr in the formula (5) higher, and thus, the structure of a function $\lambda$ of the formula (6) will become complicated, increasing the burden in the calculation. Then, in order to reduce such a burden in calculation, in the inventive device, the relation between the front wheel axle load and front wheel cornering power may be a relation obtained by approximating the front wheel cornering power as a linear (first order) function of the front wheel axle load, and the relation between the rear wheel axle load and rear wheel cornering power may be a relation obtained by approximating the rear wheel cornering power as a linear function of the rear wheel axle load. Namely, the position of the centeroid in the longitudinal direction of a vehicle may be estimated using the function $\lambda$ of the formula (6) determined with $$Kf = \kappa f(Mf) = af \cdot Mf + bf \quad (2e)$$

$$Kr = \kappa r(Mr) = ar \cdot Mr + br \quad (2f)$$

as the formulas (2a) and (2b). In this case, the order of Lf or Lr in the formula (5) is reduced, and thus, the structure of the formula (6) becomes simpler, so that it is advantageous because the burden in the calculation of Lf or Lr will be reduced.

However, in a case that a function acquired by a first-order approximation as described above is used for relations between a wheel axle load and a cornering power of front and rear wheels, the accuracy of the relation between the wheel axle load and cornering power (namely, a cornering power value given as a function of a wheel axle load), and in turn, the accuracy of an estimated centroid position in the longitudinal direction of a vehicle would vary depending upon the range of a group of values of the wheel axle load and corresponding cornering power to which the first-order approximation is applied. As explained more in detail in the descriptions of the column of embodiments described later, in order to improve the accuracy of a relation between a wheel axle load and a cornering power which are used for the estimation calculation, it is preferable to use a relation approximately obtained from a group of wheel axle load values in a region as near to the true axle load value as possible and cornering power values corresponding thereto.

Thus, in order to improve the accuracy of a relation between a wheel axle load and a cornering power which are used for the estimation calculation, one manner of the inventive device may be so designed that a provisional centroid position in the longitudinal direction of a vehicle is determined based on a vehicle weight; a provisional front wheel axle load value and a provisional rear wheel axle load value are determined from the provisional centroid position; a relation obtained by approximating the front wheel cornering power as a linear function of the front wheel axle load in a predetermined front wheel axle load range in which the provisional front wheel axle load value is almost centered is employed for the relation between the front wheel axle load and front wheel cornering power; and a relation obtained by approximating the rear wheel cornering power as a linear function of the rear wheel axle load in a predetermined rear wheel axle load range in which the provisional rear wheel axle load value is almost centered is employed for the relation between the rear wheel axle load and rear wheel cornering power; whereby the centroid position in the longitudinal direction of the vehicle is estimated. The true wheel axle load values of front wheels and rear wheels greatly vary dependent on the vehicle weight. So, by determining the wheel axle load values of the front and rear wheels provisionally in accordance with at least the present vehicle weight, and using the relations between the wheel axle load and cornering power obtained by the first-order approximation with the group of the set of wheel axle load values and cornering power values in the neighborhood (namely, the predetermined wheel axle load range) of those provisional values, it becomes possible to improve the accuracy of the eventually estimated centroid position in the longitudinal direction of the vehicle.

In one manner of determining a provisional centroid position in the longitudinal direction of a vehicle based on a vehicle weight as described above, a provisional centroid position in the longitudinal direction of a vehicle may be determined based on a vehicle weight and an expected position of a loaded object on the vehicle. Generally, the position on which a loaded object is placed in a vehicle is expectable to some extent in accordance with the shape or form of the vehicle. Thus, by taking into account the vehicle weight and the expected position of a loaded object on a vehicle, a provisional centroid position in the longitudinal direction of the vehicle can be determined.

Moreover, in another manner of determining a provisional centroid position in the longitudinal direction of a vehicle based on a vehicle weight, a provisional centroid position in the longitudinal direction of a vehicle may be determined based on the vehicle weight and a steering response characteristic of the vehicle. As described in the patent document 2, a steering response characteristic of a vehicle is dependent on the inertial moment of the vehicle. And the inertial moment of a vehicle is dependent on a vehicle weight and the position of a loaded object on the vehicle, and in turn, the centroid position of the vehicle. Thus, an approximate centroid position of a vehicle can be determined based on the vehicle weight and the steering response characteristic of the vehicle, and accordingly, it is possible to determine a provisional centroid position in the longitudinal direction of the vehicle.

By the way, in the above-mentioned manner of estimating a centroid position in the longitudinal direction of a vehicle through the determination of a provisional centroid position in the longitudinal direction of the vehicle, it is expected that an estimated centroid position is more accurate than a provisional centroid position. Thus, by resetting the value of an estimated result of the centroid position to a provisional centroid position in the longitudinal direction of a vehicle; determining relations between the wheel axle load and cornering power of the respective front and rear wheels; and executing with these relations the estimation calculation of the centroid position in the longitudinal direction of the vehicle again, a more accurate estimated centroid position, namely, a position much closer to the true centroid position, is expected to be obtained.

Accordingly, the inventive device may be further designed such that an estimated centroid position in the longitudinal direction of a vehicle is set to a new provisional centroid position in the longitudinal direction of the vehicle; a new provisional front wheel axle load value and a new provisional rear wheel axle load value are determined from the new provisional centroid position; a relation obtained by approximating the front wheel cornering power as a linear function of front wheel axle load in a predetermined front wheel axle load range in which the new provisional front wheel axle load value is almost centered is employed for the relation between the front wheel axle load and the front wheel cornering power; and a relation obtained by approximating the rear wheel cornering power as a linear function of the rear wheel axle load in a predetermined rear wheel axle load range in which the new provisional rear wheel axle load value is almost centered is employed for the relation between the rear wheel axle load and the rear wheel cornering power, whereby the centroid position in the longitudinal direction of the vehicle is estimated. In accordance with this structure, even in a case that a relation between a wheel axle load and a cornering power is given by the first-order approximation, a more improved accuracy in the estimation of a centroid position is expected. In this regard, the estimation calculation of a centroid position which is executed through setting a once estimated centroid position in the longitudinal direction of a vehicle to a new provisional centroid position in the longitudinal direction of the vehicle may be performed repeatedly (convergence calculation).

Furthermore, in the convergence calculation of the estimation of a centroid position, as described above, when a difference between a provisional centroid position and an estimated centroid position becomes small enough, it is expected that a relation between a wheel axle load and a cornering power is determined more accurately. Thus, the inventive device may be designed further such that, until a size of a difference between the provisional centroid position in the longitudinal direction of the vehicle (or the new provisional centroid position in the longitudinal direction of the vehicle)

and the estimated centroid position in the longitudinal direction of the vehicle becomes smaller than a predetermined size, the estimation calculation of the centroid position in the longitudinal direction of the vehicle is executed repeatedly.

Then, when a centroid position in the longitudinal direction of a vehicle is estimated by one of the above-mentioned manners, the present wheel axle load values of the front and rear wheels are obtained from the relations of the formulas (3a) and (3b), and further, the present cornering power values of the front and rear wheels are obtained from the relations of the formulas (2a) and (2b). Accordingly, in another manner of the above-mentioned inventive device, furthermore, based on the estimated centroid position in the longitudinal direction of the vehicle, at least one of a front wheel axle load value, a rear wheel axle load value, a front wheel cornering power value and a rear wheel cornering power value may be estimated. Thereby, it is expected that an arbitrary vehicle's behavior, motion and/or running control which uses characteristic values that vary depending on the loaded condition of the vehicle as the respective values listed above can be executed more accurately without sensors detecting an wheel axle load directly.

In one embodiment of the inventive device, there may be provided a means for a guard process for an estimated centroid position, namely, a means for avoiding that an estimated result of a centroid position deviates greatly from the true position due to a certain unwanted matter (for example, in a case that a vehicle weight value or a stability factor value is not obtained with sufficient accuracy, etc.). In that case, the weight of a loaded object (loaded weight) is computed from a vehicle weight value, and the centroid position of the vehicle in which the loaded object with the computed loaded weight are assumed to be put on the limit of the range available for placing the loaded object (for example, the foremost part or the backmost part of a loading platform) is determined (a threshold value for the centroid position), and if the centroid position obtained by the estimation calculation deviates out of the range defined by the threshold value for the centroid position, the present centroid position may be set at the threshold value for the centroid position. According to this structure, the use of an estimated centroid position with an excessively large error and/or parameters derived based on such a centroid position in arbitrary vehicle's behavior, motion and/or running controls can be avoided.

Further, with respect to the convergence calculation in the estimation of the centroid position, even when the size of a difference between a provisional centroid position in the longitudinal direction of a vehicle (or a new provisional centroid position in the longitudinal direction of a vehicle) and an estimated centroid position in the longitudinal direction of the vehicle does not reduced smaller than a predetermined size, this calculation may be ended (a) when a predetermined number of times of the calculation is repeatedly executed; (b) when the estimated centroid position in the longitudinal direction of the vehicle is not converged to a certain point (Lf or Lr does not monotonously increase or decrease); or (c) when the estimated centroid position in the longitudinal direction of the vehicle deviates from the range defined by threshold values for the centroid position.

Effects of Invention

Generally, according to the above-mentioned inventive device, as noted, it becomes possible to estimate characteristic values or conditional values that vary depending on the loaded condition on a vehicle, such as the longitudinal position of a vehicle centroid, the respective wheel axle loads of the front and rear wheels, cornering powers of the front and rear wheels without the direct detection of the loads exerted on the wheel axles of the front and rear wheels. It should be understood that, according to the inventive device, when a vehicle weight and a stability factor are estimated or detected during the running of a vehicle by an arbitrary method, the estimation of the longitudinal position of the vehicle centroid, etc. becomes possible even during the running of the vehicle. According to this feature, it is expected that, even in a vehicle whose loaded condition widely varies dependent upon the condition of its use, arbitrary vehicle's behavior, motion and/or running controls can be executed with more sufficient accuracy.

Other purposes and advantages of the present invention will become in part apparent and pointed out in the followings.

BRIEF EXPLANATIONS OF THE DRAWINGS

FIG. 1(A) is a schematic diagram of a vehicle on which a vehicle condition estimating device of a preferable embodiment of the present invention is installed (The arrows show cornering forces Kf·βf and Kr·βr generating during the turning of the vehicle (βf and βr are slip angles of front and rear wheels, respectively.).). FIG. 1(B) shows an internal structure of a vehicle condition estimating device of a preferable embodiment of the present invention in the form of a control block diagram.

Figure 4:
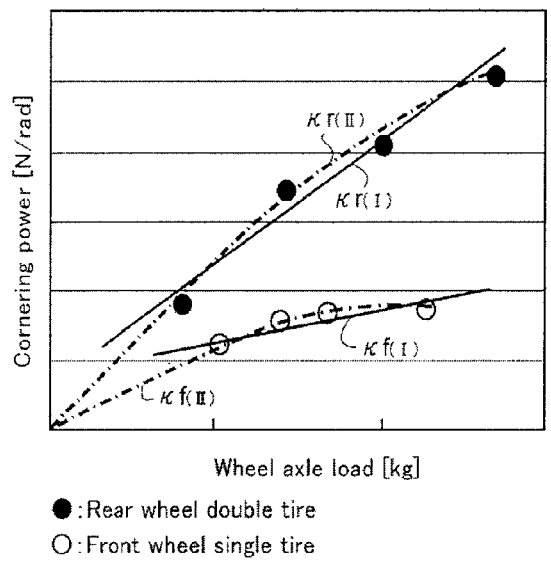

FIG. 4 is graphs showing plots of experimentally obtained data values of cornering powers to wheel axle loads of the front and rear wheels (white points and black points); their second-order approximate equations κf(II), κr(II) and first-order approximate equations κf(I), κr(I). The approximate equations are acquired from the data over the whole region of the wheel axle load values expectable in the use of a vehicle.

Figure 2:
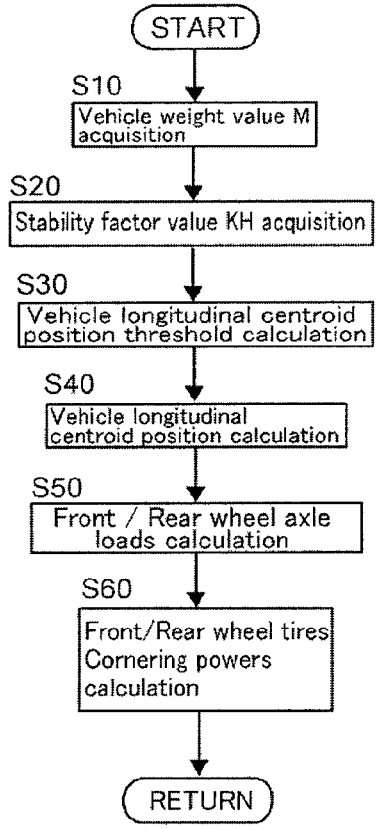
FIG. 2 shows the flow of processes in the inventive vehicle condition estimating device in the form of a flow chart.
Figure 5:
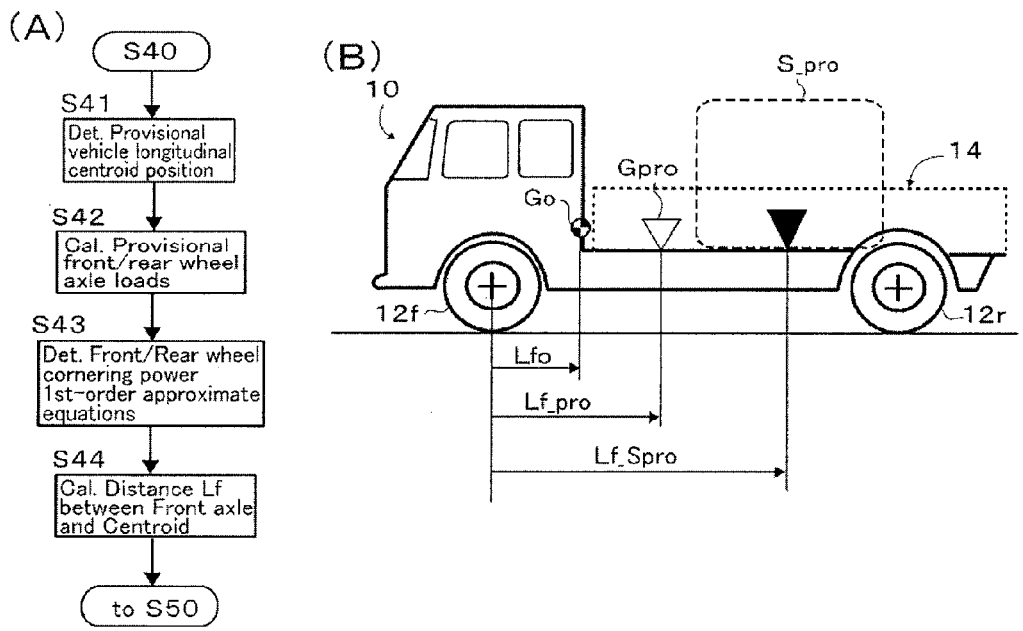

FIG. 5(A) shows processes in one embodiment of Step 40 of FIG. 2 (Examples 3 and 4) in the form of a flow chart. FIG. 5(B) is a schematic diagram of a vehicle showing the centroid position of a vehicle body, Go; the position of a loaded object assumed in determining a provisional longitudinal centroid position, S_pro; and the centroid position of the vehicle provisionally determined with the position of the loaded object, G_pro.

Figure 6:
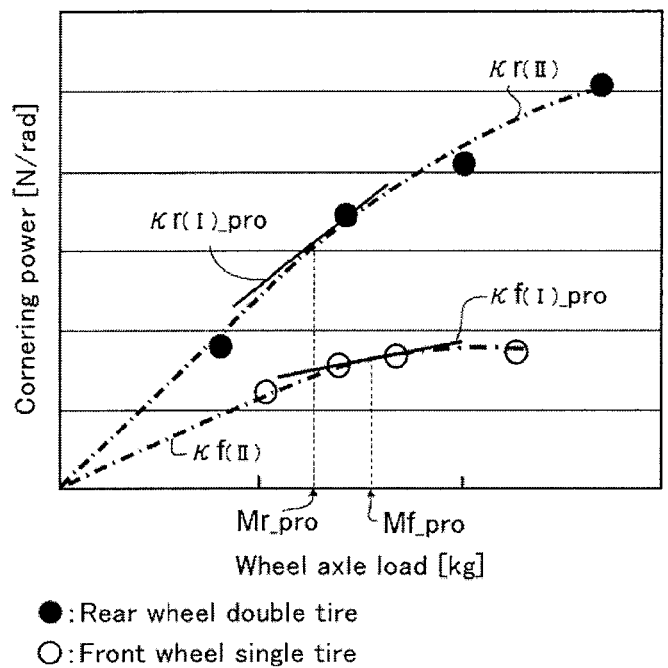

FIG. 6 is a graph similar to FIG. 4 showing first-order approximate equations κf(I)_pro, κr(I)_pro, of data in the ranges of the neighborhoods around wheel axle load values determined based on a provisional centroid position of a vehicle, G_pro.

Figure 7:
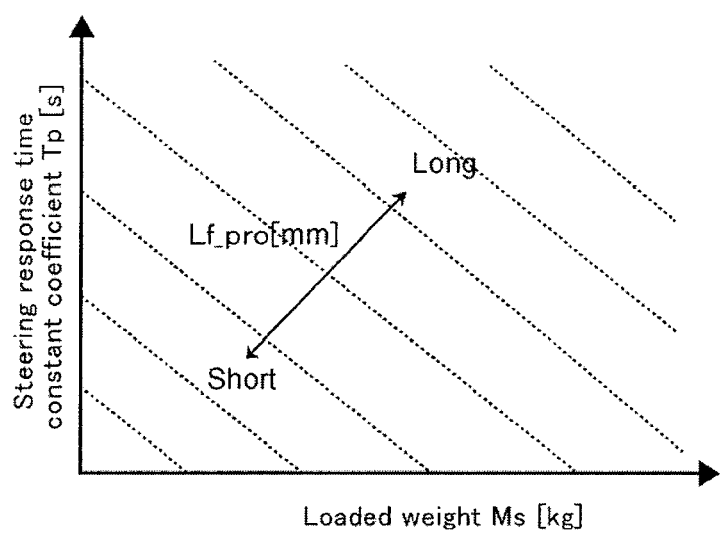

FIG. 7 shows a map which gives a provisional distance Lf_pro between a front wheel axle and a centroid with a loaded weight Ms and a steering response time constant coefficient Tp as variables. The arrow shows the length change of the Lf_pro, and the dotted lines show constant length lines.

Figure 8:
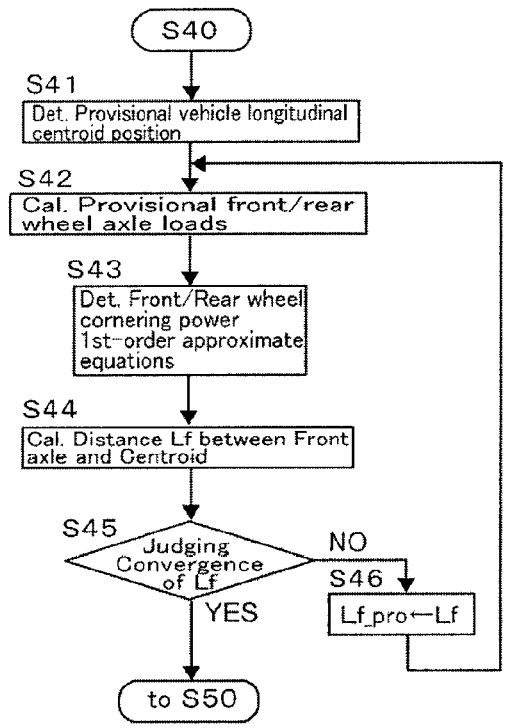

FIG. 8 shows processes in one embodiment (Example 5) of Step 40 of FIG. 2 in the form of a flow chart.

Figure 9:
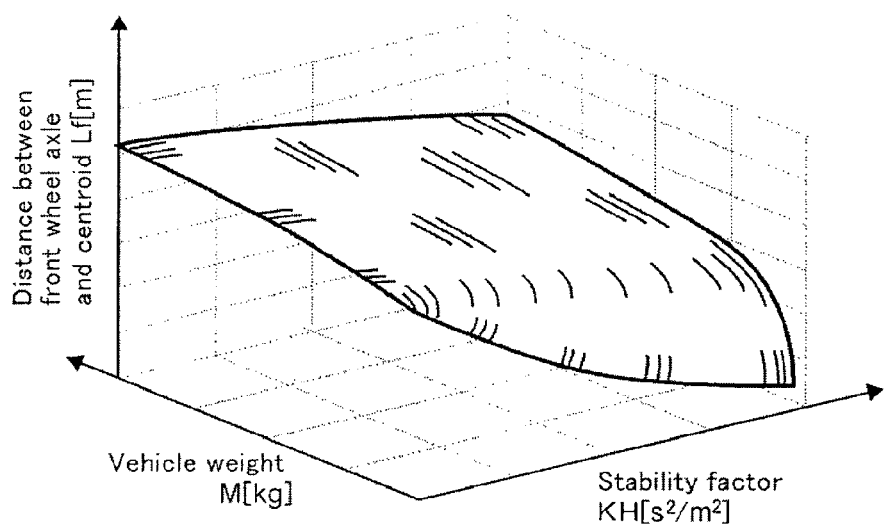

FIG. 9 shows in the form of a 3D graph a map used in the processing in one embodiment (Example 6) of Step 40 of FIG. 2, which map gives a distance Lf between a front wheel axle and a centroid with a vehicle weight M and a stability factor KH as variables.

EXPLANATIONS OF REFERENCE NUMERALS

10 - - - Vehicle
12f - - - Front wheel
12r - - - Rear wheel
14 - - - Carrier
S - - - Loaded object

BEST MODE OF THE INVENTION

General Structure of the Device

Figure 1:
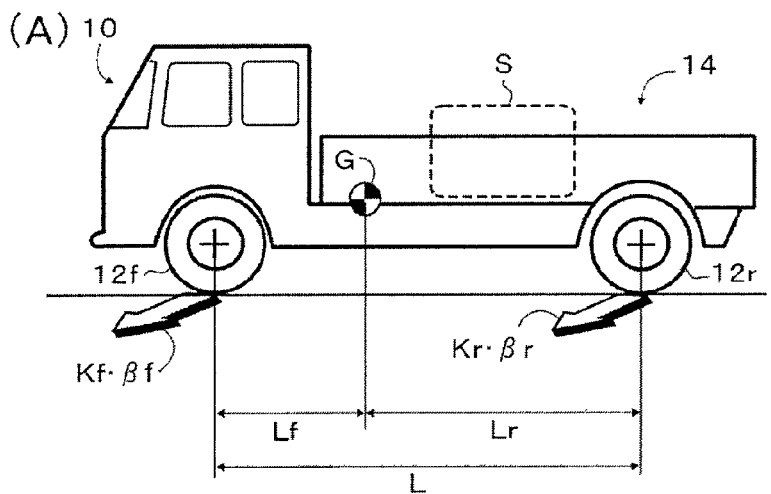
Figure 1:
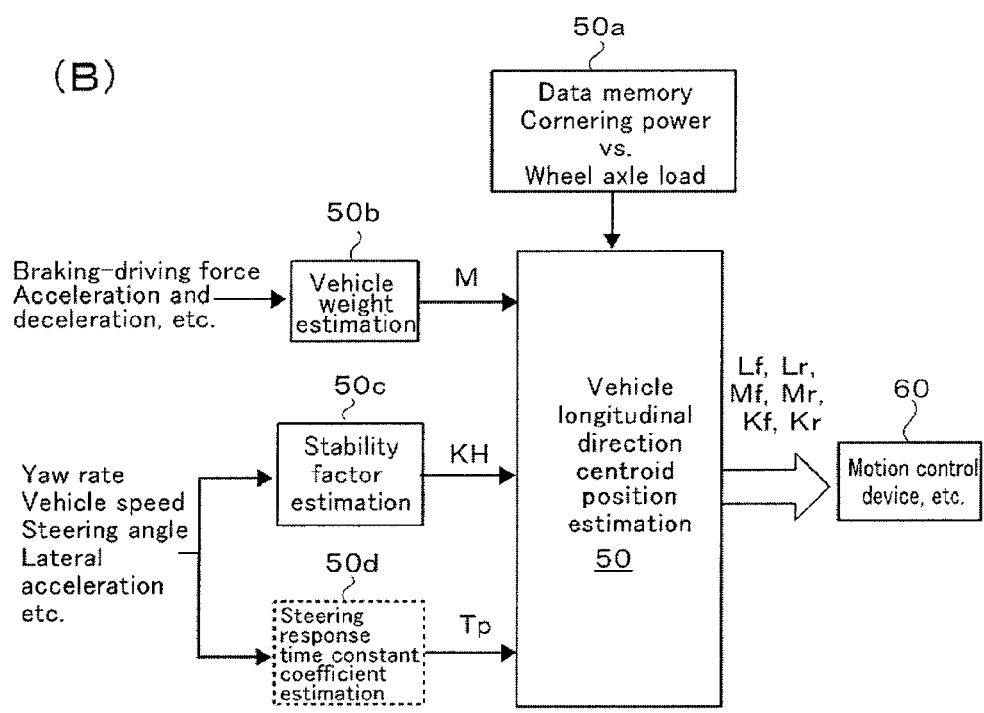

FIG. 1(A) shows a vehicle 10, such as an automobile, in which a preferable embodiment of a vehicle condition estimating device according to the present invention is installed, which device estimates the centroid position of the longitudinal direction of the vehicle, wheel axle loads and cornering powers of front wheels and rear wheels. The vehicle 10 may be a vehicle of known arbitrary type, having a pair of front wheels 12f, a pair of rear wheels 12r and a carrier (rear body) 14 on which an arbitrary loaded object S is laid. In this regard, for the simplicity, in the illustrated drawing, there is drawn a truck having on its rear portion a carrier whose upper part is opened, but, a vehicle in which an inventive vehicle condition estimating device is installed may be a truck with a box type carrier on its rear body; a vehicle with a carrier on its front portion; a bus; and other vehicles which can carry arbitrary loaded objects.

Generally, in the execution of a behavior, motion or running control of a vehicle, often, parameters, such as a centroid position in the longitudinal direction of the vehicle (a distance between the centroid and a wheel axle), wheel axle loads and cornering powers of front and rear wheels may be used. However, in the vehicle 10 as illustrated in the drawing, the parameters listed above vary depending on the weight and position of the loaded object S loaded on the carrier 14. Of course, if wheel axle loads can be detected directly with sensors etc. on the front and rear wheels (the patent document 4), the parameters as described above can be computed based upon the detected values of the load sensors, but in that case, the labors and expenses in connection with the designing and processing for attaching wheel axle load sensors near the wheel axles would be needed. Thus, in the inventive vehicle condition estimating device, the estimations of a centroid position in the longitudinal direction of a vehicle (a distance between the centroid and a wheel axle), wheel axle loads and cornering powers of front and rear wheels are performed without using a wheel axle load sensor.

In the field of the vehicle motion control, as described in the column of "Disclosure of invention", a stability factor KH is often used as one of the indices for describing the turning motional characteristics of a vehicle. In a typical four wheel vehicle (2 wheel model, i.e., the model in which that tire forces of right and left wheels are assumed to be equal to one another), it is known that a stability factor KH can be expressed by

[Expression 1]

$$KH = -\frac{M}{L^2} \cdot \frac{L_f K_f - L_r K_r}{K_f K_r} \quad (7)$$

Here, M is a vehicle weight; L is a wheel base (the distance between wheel axles of front and rear wheels), and Lf and Lr are the distances from the front wheel axle and rear wheel axle to the position of the centroid G of the vehicle 10, respectively. And, Kf and Kr are cornering powers of the front wheel and rear wheels (in 2 wheel model), respectively, which are coefficients of cornering forces (Kf·βf, Kr·βr) generating between the front wheel and rear wheel and a road surface during the turning of the vehicle 10.

In the above-mentioned formula (7), as understood from FIG. 1(A) and as mentioned in the column of "Disclosure of invention", between L, Lf, and Lr, $$L = Lf + Lr \quad (4)$$

is given. Also, as explained in detail later, the cornering powers Kf, Kr of the front wheel and rear wheels each can be expressed as a function of the wheel axle load Mf, Mr of the front wheel and rear wheel (the relation between the wheel axle load and cornering power), and thus, from the balance of the moments of forces in the perpendicular direction, the wheel axle loads Mf, Mr are associated with the distances between the centroid and the front wheel axle/rear wheel axle Lf, Lr by the following equations:

$$Mf = M \cdot Lr/L \quad (3a)$$

$$Mr = M \cdot Lf/L \quad (3b)$$

Accordingly, the cornering powers Kf, Kr of the front wheel and rear wheels in the formula (7) each are expressed as a function of the distance Lf, Lr between the front wheel axle/rear wheel axle and the centroid, and therefore, when the formula (7) is solved with respect to Lf or Lr, the Lf or Lr can be expressed as a function of the vehicle weight M and the stability factor KH (see the formula (6)). Then, in the inventive device, using a vehicle weight M and a stability factor KH obtained or calculated by an arbitrary known technique, Lf (or Lr) is computed, and then, Lr (or Lf), wheel axle loads Mf, Mr of the front wheel and the rear wheels, and cornering powers Kf, Kr of the front wheel and rear wheels are computed.

Structure and Operation of the Device

FIG. 1(B) shows in the form of a block diagram the structures of a vehicle condition estimating device and peripheral devices in accordance with one embodiment of the present invention. In this regard, the device of this embodiment may be realized by operations according to programs of an electronic control device or a computer, (which may be of a normal type having CPU, ROM, RAM and input/output port apparatus, mutually connected with bidirectional common buses), installed in a vehicle, such as an automobile. With reference to the drawing, the inventive device includes a vehicle longitudinal centroid position estimating portion 50, a data memory 50a which has memorized data representing a relation between a cornering power and a wheel axle load in each of the front and rear wheels, a vehicle weight estimating portion 50b and a stability factor estimating portion 50c. As illustrated, the vehicle weight estimating portion 50b typically estimates a present vehicle weight M (including the weight of a loaded object) based on a braking-driving force value (or a throttle opening, a braking pressure etc. for estimating the former) and an input of an acceleration and deceleration value detected by a longitudinal acceleration sensor, etc. during the running of a vehicle by an arbitrary known technique (for example, a method described in the patent document 1 may be employed.). The stability factor estimating portion 50c estimates a present stability factor value KH using a yaw rate value, a vehicle speed value, a steering angle value, a lateral acceleration value, etc. with an arbitrary known technique (for example, a method described in the patent document 2 may be used.). In the data memory 50a, depending on the form of a function representing a relation between a cornering power and a wheel axle load in an embodiment described later, there are stored coefficients of functions, data or a group of sets of cornering power values and wheel axle load values which have been obtained previously experimentally (or theoretically). The vehicle longitudinal centroid position estimating portion 50 reads-in at an appropriate time the vehicle weight M, the stability factor value KH and the coefficients of the functions or the data group representing the relation between the cornering power and wheel axle load; sequentially computes, in a manner explained later, the distances Lf, Lr between the front wheel axle/rear wheel axle and the centroid, wheel axle loads Mf, Mr, and cornering powers Kf, Kr; and renders those calculating result values to be available in arbitrary motion control devices etc. 60. In this regard, for the purpose of use in one of embodiments described in detail later, there may be provided a steering response time constant coefficient estimating portion 50d which estimates a steering response time constant coefficient Tp and outputs it to the vehicle longitudinal centroid position estimating portion 50.

FIG. 2 shows in the form of a flow chart the structure of the calculation process in the vehicle longitudinal centroid position estimating portion 50. The illustrated process may be repeatedly executed at a predetermined period during the running of a vehicle. With reference to the drawing, in the vehicle longitudinal centroid position estimating portion 50, first, a vehicle weight value M and a stability factor value KH are acquired, respectively (Steps 10 and 20). Subsequently, using the vehicle weight value M, there are computed "threshold values for the centroid position in the vehicle longitudinal direction," $Lf\_min$, $Lf\_max$, i.e., distances between the front wheel axle and the centroid of the vehicle, computed from the vehicle weight M under the assumption that a loaded object is placed at the foremost portion or the backmost portion of a loadable carrier part (Step 30). These thresholds $Lf\_min$ and $Lf\_max$ are used for a guard process of an estimated value of a distance Lf between a front wheel axle and the vehicle centroid, obtained with the vehicle weight M and the stability factor KH. And estimated values of a distance Lf between the front wheel axle and the centroid and a distance Lr between the rear wheel axle and the centroid (the centroid position in the longitudinal direction of the vehicle) are computed by either of the manners explained in detail later (Step 40), and a front wheel axle load Mf, a rear wheel axle load Mr, a front wheel (equivalent) cornering power Kf, and a rear wheel (equivalent) cornering power Kr are computed (Steps 50 and 60). Hereafter, the calculation process of each of the above-mentioned steps is explained in detail.

(a) Acquisition of a Vehicle Weight M and a Stability Factor Value KH (Steps 10 and 20)

As already noted, for a vehicle weight value M and a stability factor value KH, values estimated in an arbitrary known manner may be used. Simply, for instance, considering a relation between a generating driving force (F) and an acceleration (a) of a vehicle (or a relation between a generating braking force and a deceleration) in the accelerating or decelerating of the vehicle during its running on a straight line as well as a running resistance R, a vehicle weight M is given by the following equation:

$$M=(F-R)/\alpha \qquad (8)$$

Of course, instead of the formula (8), various forms of estimating methods of the vehicle weight may be used, and such a case belongs to the scope of the present invention. Further, a stability factor value KH is simply computable from a yaw rate γ, a steering angle δ, and a vehicle speed V during the steady turning of a vehicle by:

$$KH=\{(V\cdot\delta/L\cdot\gamma)-1\}/V^2 \qquad (9)$$

In this regard, as in the patent document 2, the estimation may be done, while the first order lag of a yaw rate from the steering angle is taken into account, and such a case belongs to the scope of the present invention.

(b) Calculation of a Threshold Value for the Centroid Position in the Vehicle Longitudinal Direction (Step 30)

As already noted, in the inventive device, the centroid position in the longitudinal direction of a vehicle is estimated using a vehicle weight M and a stability factor KH. However, when the accuracy of the vehicle weight M and/or the stability factor KH, used for variable parameters, is low, or when provisional values of said values are used as mentioned below, it is possible that an estimated centroid position in the longitudinal direction of a vehicle excessively deviates from its true position. Thus, at the stage where the weight of a loaded object has been determined, the range, i.e., thresholds, of the centroid position in the longitudinal direction of a vehicle which can be assumed from the structure of a carrier and the weight of the loaded object, are computed.

In detail, a weight Ms of a loaded object is first computed from a vehicle weight M and a vehicle weight without loaded object Mo by:

$$Ms=M-Mo \qquad (10)$$

Here, the vehicle weight Mo without loaded object is the weight of only a vehicle body, the weight of the vehicle including the driver's weight or the weight of the vehicle including the weight of the number of actually riding persons. (In a case that the weight of the number of actually riding persons is taken into account, the number of actually riding persons may be detected by a sitting sensor or a seat belt switch, and the weight value acquired by multiplying this number on an average human body weight value may be added to the weight of only the vehicle body.)

Figure 3:
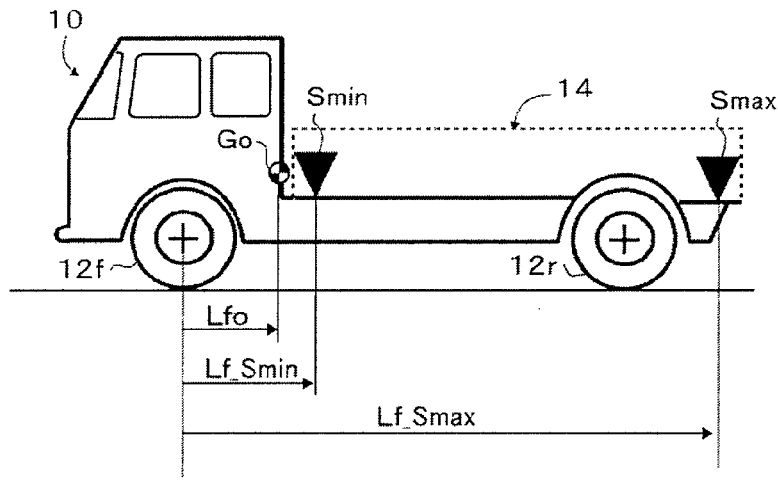
FIG. 3 is a schematic diagram of a vehicle, which describes centroid positions S_min and S_max of a loaded object assumed in determining thresholds of a centroid position in the longitudinal direction of the vehicle. The side wall of a carrier 14 is shown by the broken line.

Then, as shown in FIG. 3, a distance, $Lf\_min$, between the front wheel axle and the centroid in a case that a loaded object is placed on the foremost position 5 min of a carrier 14, and a distance, $Lf\_max$, between the front wheel axle and the centroid in a case that the loaded object is placed in the backmost position Smax of the carrier 14 are computed by the following equations:

$$Lf\_min=(Mo\cdot Lfo+Ms\cdot Lf\_Smin)/M \qquad (11)$$

$$Lf\_max=(Mo\cdot Lfo+Ms\cdot Lf\_Smax)/M \qquad (12)$$

Here, $Lf\_Smin$ is the longitudinal distance between the front wheel axle and the position Smin; $Lf\_Smax$ is the longitudinal distance between the front wheel axle and the position Smax; and Lfo is the longitudinal distance between the centroid Go of the vehicle without loaded object and the front wheel axle. Thus, a distance Lf between the front wheel axle and the centroid computed in the following step 40 is expected to satisfy the condition:

$$LF\_min \le Lf \le Lf\_max \qquad (13)$$

and if the distance Lf deviates out of the range [$Lf\_min$, $Lf\_max$], Lf is set to $LF\_min$ or $Lf\_max$. In this regard, in the formulas (11) and (12), a variable parameter is only Ms. Thus, instead of calculating the formulas (11) and (12), maps prepared for $Lf\_min$ and $Lf\_max$, respectively, in which the loaded weight Ms is used as a variable, may be referred to in Step 30.

(c) Calculation of a Centroid Position in the Longitudinal Direction of a Vehicle (Step 40)

As described the column of "Disclosure of invention", in the inventive device, a distance Lf between a front wheel axle and a centroid is computed using a function of the form of the formula (6), which is obtained by solving Lf (or Lr) from an formula given by using the relations of the formulas (2a), (2b), (3a), (3b) and (4) to eliminate the variables Kf, Kr, and Lr (or Lf) in the formula (7) giving a stability factor KH (an example of the formula (1)). In this respect, regarding the structure of the formula (6), various forms can be considered according to the forms of the formulas (2a) and (2b). In the followings, several examples of the ways of computing a distance Lf between a front wheel axle and a centroid with a vehicle weight M and a stability factor KH as variables are explained.

(i) Example 1

A Case where a Relation Between a Wheel Axle Load and a Cornering Power is Expressed with a Quadratic Function The graphs in FIG. 4 show plots of experimentally acquired data values of the cornering powers to the wheel axle load. In the drawing, the white circles show the values in a case of a front wheel of a single tire, and the black circles show the values in a case of a rear wheel of a double tire. As understood from the drawing, the value of the cornering power to the wheel axle load increases monotonously with the increase of the wheel axle load and then changes to be saturated. These cornering power values can be well approximated by quadratic functions of wheel axle loads Mf, Mr as shown by alternate long and short dash lines κf(II), κr(II) in the drawing:

$$\kappa f(II) = af \cdot Mf^2 + bf \cdot Mf + cf \quad (14a);$$

$$\kappa r(II) = ar \cdot Mr^2 + br \cdot Mr + cr \quad (14b).$$

And, the wheel axle loads Mf and Mr are expressed in the form of a function of Lf with the formulas (3a), (3b), and (4). Thus, in the present embodiment, Lf is computed by means of an expression resulting from transformation of the formula (7) into the form of a function of Lf using the formulas (14a) and (14b) as the formulas (2a) and (2b):

$$Lf = \lambda(KH, M, L, af, bf, cf, ar, br, cr) \quad (6a).$$

The constant coefficients af, bf, cf, ar, br, and cr in the formulas (14a), (14b) may be determined with the least square method or other arbitrary second-order approximation technique from data values, obtained experimentally beforehand, of cornering powers to wheel axle loads. Further, in the structure of this example, the previously computed constant coefficients af, bf, cf, ar, br, and cr in the formulas (14a), (14b) may be stored in the data memory, and read out in the execution of Step 40. In this regard, although the description of the concrete representation of the formula (6a) is omitted, it should be understood that the formula can be computed out by one skilled in the art.

(ii) Example 2

A Case where a Relation Between a Wheel Axle Load and a Cornering Power is Expressed with a Linear Function In the above-mentioned example 1, a quadratic function is used for an expression representing a relation between a wheel axle load and a cornering power, but in that case, the structure of the function λ of the formula (6a) becomes complicated, which would result in heavy calculation load. So, in this embodiment, Lf is computed with the formula (6) obtained by using, as the formulas (2a) and (2b), expressions representing a cornering power value as a linear function of a wheel axle load, as shown by solid lines κr(I), κf(I) in FIG. 4:

$$\kappa f(I) = af \cdot Mf + bf \quad (15a);$$

$$\kappa r(I) = ar \cdot Mr + br \quad (15b).$$

The concrete expression of Lf is:

$$Lf = (L/2) \cdot (KH \cdot L \cdot af \cdot M \cdot ar - KH \cdot L \cdot br + KH \cdot L \cdot bf \cdot ar + af \cdot M + bf - ar \cdot M + br + (2br \cdot b f + KH^2 \cdot L^2 \cdot af^2 br^2 - 2KH \cdot L \cdot af \cdot br^2 + KH^2 \cdot L^2 \cdot bf^2 \cdot ar^2 + 2KH \cdot L \cdot bf^2 \cdot ar - 2bf \cdot ar \cdot M + 2ar \cdot M \cdot br + af^2 \cdot M^2 + bf^2 + ar^2 \cdot M^2 + br^2 KH^2 \cdot af^2 \cdot M^2 \cdot ar^2 + 2KH^2 \cdot L^2 \cdot af^2 M \cdot ar \cdot br + 2KH^2 \cdot L^2 \cdot af \cdot M \cdot ar^2 \cdot bf + 2KH \cdot L \cdot af^2 \cdot M^2 \cdot ar - 2KH \cdot L \cdot af \cdot M^2 \cdot ar^2 + 2KH^2 \cdot L^2 \cdot af \cdot br \cdot bf \cdot ar + 2K H \cdot L \cdot af^2 \cdot br \cdot M - 2KH \cdot L \cdot bf \cdot ar^2 \cdot M + 4KH \cdot L \cdot af \cdot M \cdot ar \cdot bf - 4KH \cdot L \cdot af \cdot M \cdot ar \cdot br + 2KH \cdot L \cdot af \cdot br \cdot bf - 2KH \cdot L \cdot af \cdot ar \cdot br - 2af \cdot M \cdot br - 2af \cdot M \cdot bf)^{1/2})/((KH \cdot L \cdot af \cdot ar + af - ar) M) \quad (16)$$

The concrete values of the constant coefficients af, bf, ar, and br in the formulas (15a), (15b) may be determined with the least square method or other arbitrary first-order approximation technique from data values, obtained experimentally beforehand, of cornering powers to wheel axle loads.

(iii) Example 3

A Case where a Relation Between a Wheel Axle Load and a Cornering Power is Expressed by Means of a Linear Function with a Provisional Centroid Position in the Vehicle Longitudinal Direction The centroid position of a vehicle widely varies depending on an actual loaded weight. Thus, if a relation between a wheel axle load and a cornering power is expressed with a first-order approximate equation without taking a loaded weight into account as in the above-mentioned example 2, the reduction of the accuracy of a computed distance Lf between a front wheel axle and a centroid could occur depending on an actual loaded weight. Actually, in FIG. 4, there are portions having a large size of the difference between κf(II) and κ(I) or between κr(II) and κr(I) (κf(I) and κr(I) were obtained by a first-order approximation of the data values of cornering powers to wheel axle load values in the whole region of the expectable wheel axle loads.). Then, in the present embodiment, the accuracy of the first-order approximate equation of a relation between a wheel axle load and a cornering power is improved by limiting the range of the experimentally previously obtained data values of cornering powers to wheel axle loads, used in expressing a relation between a wheel axle load and a cornering power with a first-order approximate equation, to the range expected from an actual loaded weight, and thereby, the improvement in the accuracy of a computed Lf is achieved.

FIG. 5(A) shows the process of Step 40 in the present embodiment in the form of a flow chart in more detail. In the process, first, there is determined a provisional centroid position G_pro in the longitudinal direction of a vehicle under a condition S_pro where an actual loaded object is assumed to be placed on an appropriate position on a carrier, e.g. the center of the carrier, as illustrated in FIG. 5(B) (Step 41). Concretely, for example, under an assumption that the centroid of an actual loaded object is located in the almost center of the carrier (assuming a distance Lf_Spro between the front wheel axle and the centers of the carrier), a provisional distance Lf_pro between the front wheel axle and the centroid and a provisional distance Lr_pro between the rear wheel axle and the centroid are determined by the following equations:

$$Lf\_pro = (Mo \cdot Lfo + Ms \cdot Lf\_Spro)/M \qquad (17a)$$

$$Lr\_pro = L - Lf\_pro \qquad (17b)$$

Thereby, a provisional front wheel axle load Mf_pro and a provisional rear wheel axle load Mr_pro are given by the following equations (Step 42):

$$Mf\_pro = M \cdot Lr\_pro/L \qquad (18a)$$

$$Mr\_pro = M \cdot Lf\_pro/L \qquad (18b)$$

Next, using wheel axle load values in a predetermined range in which the provisional front wheel axis load Mf_pro or the provisional rear wheel axis load Mr_pro obtained as described above is almost centered, e.g. of ±100 kg, and the data values of cornering powers corresponding thereto, there are determined relational expressions of cornering powers and wheel axle loads in the forms of the formulas (15a), (15b) as in Example 2, i.e., the constant coefficients af, bf, ar and br (Step 43). These constant coefficients may be determined by reading out a group of data values in a predetermined range in which the provisional front wheel axis load Mf_pro or provisional rear wheel axis load Mr_pro is almost centered from the group of the data values of cornering powers to wheel axle load values in the whole region of the wheel axle loads expectable during the use of a vehicle. In this case, as illustrated in FIG. 6, since the range used for a first-order approximation is limited to a predetermined range, the difference from the actual data values or quadratic expressions $\kappa f(II)$ and $\kappa r(II)$ becomes small, and thereby, the accuracies of the relational expressions of cornering powers and wheel axle loads in the forms of the formulas (15a), (15b) is expected to be improved.

Then, a distance Lf between the front wheel axle and the centroid is computed using the formula (16) with the obtained constant coefficients af, bf, ar, br, vehicle weight M and stability factor KH. In this regard, the centroid position of a loaded object in the determination of a provisional centroid position may be set up arbitrarily, not on the center of the carrier, and it should be understood that such a case belongs to the scope of the present invention, also. In a case where, as in the illustrated vehicle 10, a carrier is installed on the rear portion of a vehicle, the site on which a loaded object is placed can be specified to some extent from the structure of the carrier. Thus, the centroid position of a loaded object in the determination of a provisional centroid position may be set based on such a structure of a carrier.

(iv) Example 4

A Case where a Relation Between a Wheel Axle Load and a Cornering Power is Expressed with a Linear Function Using a Provisional Centroid Position in the Longitudinal Direction of a Vehicle Determined from a Steering Response Characteristic When a provisional centroid position in the longitudinal direction of a vehicle G_pro determined as in Example 3 is used for the determination of a linear function expressing a relation between a cornering power and a wheel axle load, in order to improve the accuracy of the calculated result, it is preferable that the provisional centroid position in the longitudinal direction of the vehicle G_pro is as close to the true centroid position as possible. In the present embodiment, in order to make a provisional centroid position in the longitudinal direction of a vehicle G_pro as close to the true centroid position as possible, the provisional centroid position in the longitudinal direction of the vehicle G_pro is determined with reference to a steering response characteristic of the vehicle. As described in the patent document 2, it is known that a steering response time constant coefficient Tp, one of the indices of steering response characteristics, is given by a function of a yaw inertial moment I of a vehicle:

$$Tp = I/L^2 (1/Kf + 1/Kr) \qquad (19)$$

The yaw inertial moment I of a vehicle increases with the increase of a loaded weight and the increase in a distance of a loaded position from a vehicle centroid. Namely, the steering response time constant coefficient Tp increases as the loaded weight becomes heavier and the loaded position separates further from the vehicle centroid. Thus, using the relation between a steering response time constant coefficient and the weight and position of a loaded object, it is tried to more accurately determine a provisional centroid position G_pro in the longitudinal direction of a vehicle.

Concretely, in the steering response time constant coefficient estimating portion 50*d*, an estimated steering response time constant coefficient Tp is first acquired in an arbitrary known manner, which may be a method as described in the patent document 2. And, a provisional distance Lf_pro between the front wheel axle and the centroid is determined using a previously obtained map, as shown in FIG. 7, with a steering response time constant coefficient Tp and a loaded weight Ms as parameters. When a carrier 14 is provided on a vehicle rear body as in the illustrated vehicle 10, it is understood that the centroid of the whole vehicle moves backwardly and the distance Lf between the front wheel axle and the centroid becomes longer as the loaded weight Ms increases and as the steering response time constant coefficient Tp increases as illustrated in FIG. 7. Then, using the determined provisional distance Lf_pro between the front wheel axle and the centroid as in Example 3, a provisional distance Lr_pro between the rear wheel axle and centroid, a provisional front wheel axis load Mf_pro and a provisional rear wheel axis load Mr_pro are determined one by one, and the relational expressions between cornering powers and wheel axle loads in the forms of the formulas (15a), (15b), i.e., the constant coefficients af, bf, ar and br are determined. And the distance Lf between the front wheel axle and the centroid is computed using the formula (16).

(v) Example 5

A Case where a Linear Function Expressing a Relation Between a Wheel Axle Load and a Cornering Power is Determined with Convergence Calculation As in Example 3 or Example 4, a distance Lf between a front wheel axle and a centroid, which has been estimated from the formula (16) through the determination of a provisional distance Lf_pro between the front wheel axle and the centroid and the determination of a linear function expressing a relation between a wheel axle load and a cornering power with the provisional distance Lf_pro, is expected to be a value closer to the true distance between the front wheel axle and the centroid Lf than the provisional distance between the front wheel axle and the centroid. Thus, when a linear function which expresses a relation between a wheel axle load and a cornering power is determined while once computed distance Lf between the front wheel axle and the centroid is set to a provisional distance Lf_pro between the front wheel axle and the centroid, a still more accurate estimation of the distance Lf between the front wheel axle and the centroid is expected. Then, in the present embodiment, while a once estimated distance Lf between the front wheel axle and the centroid is set to a provisional distance Lf_pro between the front wheel axle and the centroid, the determination of a linear function expressing a relation between a wheel axle load and a cornering power using the newly set provisional distance Lf_pro between the front wheel axle and the centroid and the calculation of the distance Lf between the front wheel axle and the centroid with the formula (16) are repeated until the difference between the provisional distance Lf_pro between the front wheel axle and the centroid and the distance Lf between the front wheel axle and the centroid obtained by the formula (16) becomes small enough, and thereby the improvement in the accuracy of the estimated value of the distance Lf between the front wheel axle and the centroid is achieved.

FIG. 8 shows the process of Step 40 in the present embodiment in the form of a flow chart more in detail. With reference to the drawing, first, the first provisional distance Lf_pro between the front wheel axle the centroid is determined as explained in Example 3 or Example 4 (Step 41). After this, the determination of a provisional distance Lr_pro between the rear wheel axle and the centroid, a provisional front wheel axis load Mf_pro and a provisional of rear wheel axis load Mr_pro (Step 42); the determination of the constant coefficients af, bf, ar, and br in the formula (15a), (15b) (Step 43) and the calculation of a distance Lf between the front wheel axle and the centroid with the formula (16) (Step 44) are executed. After the distance Lf between the front wheel axle and the centroid has been so computed, whether or not the size of the difference between Lf and Lf_pro is smaller than a predetermined threshold, namely, if $$|Lf - Lf\_pro| < L(\text{threshold}) \quad (20)$$

is established is judged (Step 45). Here, when it is judged that the condition (20) is not established, the computed Lf is set to Lf_pro (Step 46), and Steps 42, 43, and 44 are repeated. And as a result of the repetitive executions of these processes, when the condition (20) is established, the distance Lf between the front wheel axle and the centroid, computed out at this time, is determined as the final distance Lf between the front wheel axle and the centroid.

In this regard, in the judgment of Step 45, even if the condition (20) is not established, the repetitive executions (convergence calculation) of Steps 42, 43, and 44 may be stopped in the following cases:
(1) When more than a predetermined number of times (for example, 3 times or more) of the convergence calculation are executed;
(2) When the value of Lf does not monotonously increase or decrease [when the sign of the difference between the newest Lf and Lf of the cycle before the newest one is reversed];
(3) When the value of Lf deviates from the range of [Lf_min, Lf_max].

(vi) Example 6

A Case of Use of a Map with a Vehicle Weight M and a Stability Factor KH as Variable Parameters As already understood, a distance Lf between a front wheel axle and a centroid is given with a vehicle weight M and a stability factor KH as variables. Then, a map which gives a distance Lf between a front wheel axle and a centroid with a vehicle weight M and a stability factor KH as variable parameters as shown in FIG. 9 is prepared beforehand, and, during the running of a vehicle, with reference to the map, the distance Lf between the front wheel axle and the centroid may be determined from the values of the vehicle weight M and the stability factor KH. This case is advantageous in that the calculation load in the processing is substantially reduced as compared with the cases of the above-mentioned examples 1-5.

In this regard, as already noted, in any case of Examples 1-6, when a computed value Lf deviates from said range of [Lf_min, Lf_max], Lf is set to Lf_min or Lf_max (a guard process). Namely, $$\text{If } Lf < Lf\_\min, \text{ then } Lf \Box Lf\_\min \quad (21a)$$

$$\text{If } Lf\_\max < Lf, \text{ then } Lf \Box Lf\_\max \quad (21b)$$

Then, when the distance Lf between the front wheel axle and the centroid is determined in one manner of the above-mentioned examples 1-6, the distance Lr between the rear wheel axle and the centroid is computed out by:

$$Lr = L - Lf \quad (22)$$

(d) Calculation of a Front Wheel Axle Load Mf, a Rear Wheel Axle Load Mr, a Front-Wheel (Equivalent) Cornering Power Kf, and a Rear-Wheel (Equivalent) Cornering Power Kr (Steps 50 and 60)

Thus, when a distance Lf between a front wheel axle and a centroid, and a distance Lr between a rear wheel axle and the centroid are computed, a front wheel axle load Mf and a rear wheel axle load Mr are computed using the formulas (3a) and (3b), respectively (Step 50), and a front wheel cornering power Kf and a rear wheel cornering power Kr are computed using the formulas (14a) and (14b) [in the cases of Examples 1 and 6] or the formulas (15a) and (15b) [in the case of Examples 2-5].

(e) When a Vehicle Weight M or a Stability Factor Value KH has not been Estimated By the way, if a vehicle weight M or a stability factor value KH has not been estimated in the execution of Step 10 or 20, for example, after the start of the running of a vehicle, when no acceleration and deceleration running in a straight line which enables an estimation of a vehicle weight M is carried out; or when no turning which enables an estimation of a stability factor value KH is carried out, a provisional value is used for the vehicle weight M or the stability factor value KH. For example, for a provisional value of a vehicle weight M at a time when the vehicle weight M has not been estimated, a specified total vehicle weight, i.e., the sum of the weight of a vehicle body, the weight of riding capacity and the specific value of the maximum allowable load weight may be used (The reason for using the specified vehicle total weight as the provisional value is because the control of a vehicle becomes more difficult for a driver as the loaded amount increases).

On the other hand, a provisional value for a stability factor value KH at a time when the stability factor value KH has not been estimated may be computed out with the formula (7) under an assumption that a loaded object is almost centered on a carrier and the centroid of the loaded object exists on the center of the carrier. In the formula (7), in order to compute a stability factor value KH, there are required a distance Lf between a front wheel axle and a centroid, a distance Lr between a rear wheel axle and a centroid, and cornering powers Kf, Kr of the front and rear wheels. The distance Lf between the front wheel axle and the centroid and the distance Lr between the rear wheel axle and the centroid for the provisional value may be computed by:

$$Lf = (Mo \cdot Lfo + (M-Mo) \cdot Lfsc)/M \quad (22a)$$

$$Lr = L - Lf \quad (22b)$$

Here, Mo is the weight of a vehicle body (the weight without loaded objects); Lfo is the longitudinal distance from the centroid of the vehicle body to the front wheel axle; and Lfsc is the longitudinal distance from the center of the carrier to the front wheel axle (The vehicle weight M, when it has not been estimated, may be a specified vehicle total weight as mentioned above). Moreover, the cornering powers Kf, Kr of the front and rear wheels may be computed by substituting, into said previously obtained relational formulas (14a), (14b) of the respective cornering powers and wheel axle loads Mf, Mr of the front and rear wheels, the wheel axle load values Mf, Mr obtained by substituting the results of the formula (22a), (22b) into the relational formulas (3a), (3b).

Thus, according to the above-mentioned inventive device, the estimations of the centroid position in the longitudinal direction of a vehicle, wheel axle loads and cornering powers of front and rear wheels become possible without detecting a wheel axle load directly by a sensor, etc.

Although this invention has been explained above in detail with respect to particular cases of embodiments, this invention is not limited to the above-mentioned embodiments, and it is apparent for ones skilled in the art that other various embodiments are possible within the scope of the present invention.

For example, although, in the above-mentioned example, a distance Lf between a front wheel axle and a centroid is computed first and a distance Lr between a rear wheel axle and the centroid is computed in Step 40, the distance Lr between the rear wheel axle and the centroid may be computed first using an expression obtained by solving the formula (7) of a stability factor KH with respect to the distance Lr between the rear wheel axle and the centroid, and the distance Lf between the front wheel axle and the centroid may be computed from the relation of the formula (4).

Moreover, although, in the above-mentioned example, the formula (7) obtained under the assumption of the two wheel model is used for the formula (1) expressing the relation among a stability factor KH, a distances between front and rear wheel axles and the centroid and cornering powers, a different expression may be used for a relational expression corresponding to the formula (1), depending upon the structure of a vehicle, and it should be understood that such a case also belongs to an scope of the present invention.

The invention claimed is:

1. A vehicle motion controlling device, wherein the device comprises:
    a vehicle weight estimating unit estimating a vehicle weight value and a stability factor value;
    a data memory unit storing a relation between a front wheel axle load and a front wheel cornering power and a relation between a rear wheel axle load and a rear wheel cornering power; and
    a vehicle longitudinal centroid position estimating unit estimating a centroid position in a longitudinal direction of the vehicle based on the vehicle weight value, the stability factor value, the relation between the front wheel axle load and the front wheel cornering power and the relation between the rear wheel axle load and the rear wheel cornering power,
    wherein the vehicle motion controlling device controls the vehicle in accordance with the estimated centroid position.

2. The device of claim 1, wherein the device estimates at least one of a front wheel axle load value, a rear wheel axle load value, a front wheel cornering power value, and a rear wheel cornering power value based on the estimated centroid position in the longitudinal direction of the vehicle.

3. The device of claim 1, wherein the relation between the front wheel axle load and the front wheel cornering power is a relation obtained by approximating the front wheel cornering power as a quadratic function of the front wheel axle load, and the relation between the rear wheel axle load and the rear wheel cornering power is a relation obtained by approximating the rear wheel cornering power as a quadratic function of the rear wheel axle load.

4. The device of claim 1, wherein the relation between the front wheel axle load and the front wheel cornering power is determined from a group of previously obtained values of the front wheel cornering power to the front wheel axle load and the relation between the rear wheel axle load and the rear wheel cornering power is determined from a group of previously obtained values of the rear wheel cornering power to the rear wheel axle load.

5. The device of claim 1, wherein the device estimates the centroid position in the longitudinal direction of the vehicle using a function obtained based upon the relation between the front wheel axle load and the front wheel cornering power and the relation between the rear wheel axle load and the rear wheel cornering power, where the vehicle weight value and the stability factor value are employed as variables of the function.

6. The device of claim 1, wherein the relation between the front wheel axle load and the front wheel cornering power is a function obtained by approximating the front wheel cornering power as a linear function of the front wheel axle load, and the relation between the rear wheel axle load and the rear wheel cornering power is a function obtained by approximating the rear wheel cornering power as a linear function of the rear wheel axle load.

7. The device of claim 6, wherein a provisional centroid position in the longitudinal direction of the vehicle is determined based on the vehicle weight; a provisional front wheel axle load value and a provisional rear wheel axle load value are determined from the provisional centroid position; a relation obtained by approximating the front wheel cornering power as a linear function of the front wheel axle load in a predetermined front wheel axle load range in which the provisional front wheel axle load value is almost centered is employed for the relation between the front wheel axle load and the front wheel cornering power; and a relation obtained by approximating the rear wheel cornering power as a linear function of the rear wheel axle load in a predetermined rear wheel axle load range in which the provisional rear wheel axle load value is almost centered is employed for the relation between the rear wheel axle load and the rear wheel cornering power; whereby the centroid position in the longitudinal direction of the vehicle is estimated.

8. The device of claim 7, wherein a first provisional centroid position in the longitudinal direction of the vehicle is determined based on the vehicle weight and a presumed position of a loaded object on the vehicle.

9. The device of claim 7, wherein a first provisional centroid position in the longitudinal direction of the vehicle is determined based on the vehicle weight and a steering response characteristic of the vehicle.

10. The device of claim 7, wherein the estimated centroid position in the longitudinal direction of the vehicle is set to a new provisional centroid position in the longitudinal direction of the vehicle; a new provisional front wheel axle load value and a new provisional rear wheel axle load value are determined from the new provisional centroid position; a relation obtained by approximating the front wheel cornering power as a linear function of the front wheel axle load in a predetermined front wheel axle load range in which the new provisional front wheel axle load value is almost centered is employed for the relation between the front wheel axle load and the front wheel cornering power; and a relation obtained by approximating the rear wheel cornering power as a linear function of the rear wheel axle load in a predetermined rear wheel axle load range in which the new provisional rear wheel axle load value is almost centered is employed for the relation between the rear wheel axle load and the rear wheel cornering power, whereby the centroid position in the longitudinal direction of the vehicle is estimated.

11. The device of claim 10, wherein, until a size of a difference between the provisional centroid position in the longitudinal direction of the vehicle or the new provisional centroid position in the longitudinal direction of the vehicle and the estimated centroid position in the longitudinal direction of the vehicle becomes smaller than a predetermined size, the estimating calculation of the centroid position in the longitudinal direction of the vehicle is executed repeatedly.

* * * * *

UNITED STATES PATENT AND TRADEMARK OFFICE
CERTIFICATE OF CORRECTION

PATENT NO. : 9,096,232 B2  
APPLICATION NO. : 13/131408  
DATED : August 4, 2015  
INVENTOR(S) : T. Yokota Page 1 of 1

It is certified that error appears in the above-identified patent and that said Letters Patent is hereby corrected as shown below:

In The Specification

At column 9, line 13, change "BEST MODE OF THE INVENTION" to -- BEST MODE OF THE DEVICE --

At column 11, line 59, change "acceleration (a) of" to -- acceleration (α) of --

At column 14, line 14, of formula (16), change "$Lf=(L/2) \cdot (\ldots -KH \cdot L \cdot br + \ldots)$" to
-- $Lf=(L/2) \cdot (\ldots -KH \cdot L \cdot af \cdot br + \ldots)$ --

At column 14, line 5, of formula (16), change "$\ldots br^2 KH^2 \cdot af^2 \cdot M^2 \cdot ar^2 \ldots$" to
-- $\ldots br^2 + KH^2 \cdot L^2 \cdot af^2 \cdot M^2 \cdot ar^2 \ldots$ --

At column 14, line 10, of formula (16), change "$\ldots -2KH \cdot L \cdot af \cdot ar \cdot br - 2af \cdot M \cdot br - \ldots$" to
-- $\ldots -2KH \cdot L \cdot bf \cdot ar \cdot br - 2af \cdot M \cdot br - \ldots$ --

At column 14, line 11, of formula (16), change "$\ldots 2af \cdot M \cdot bf)^{1/2}) \ldots$" to
-- $\ldots 2af \cdot M^2 \cdot ar + 2af \cdot M \cdot bf)^{1/2}) \ldots$ --

At column 18, line 15, condition (21a), change "$\ldots$ If $Lf < Lf\_min$, then $Lf \square Lf\_min \ldots$" to
-- $\ldots$ If $Lf < Lf\_min$, then $Lf \leftarrow Lf\_min \ldots$ --

At column 18, line 19, condition (21b), change "$\ldots$ If $Lf\_max < Lf$, then $Lf \square Lf\_max \ldots$" to
-- $\ldots$ If $Lf\_max < Lf$, then $Lf \leftarrow Lf\_max \ldots$ --

Signed and Sealed this  
Fifth Day of July, 2016

Michelle K. Lee  
*Director of the United States Patent and Trademark Office*